Patented Feb. 19, 1935

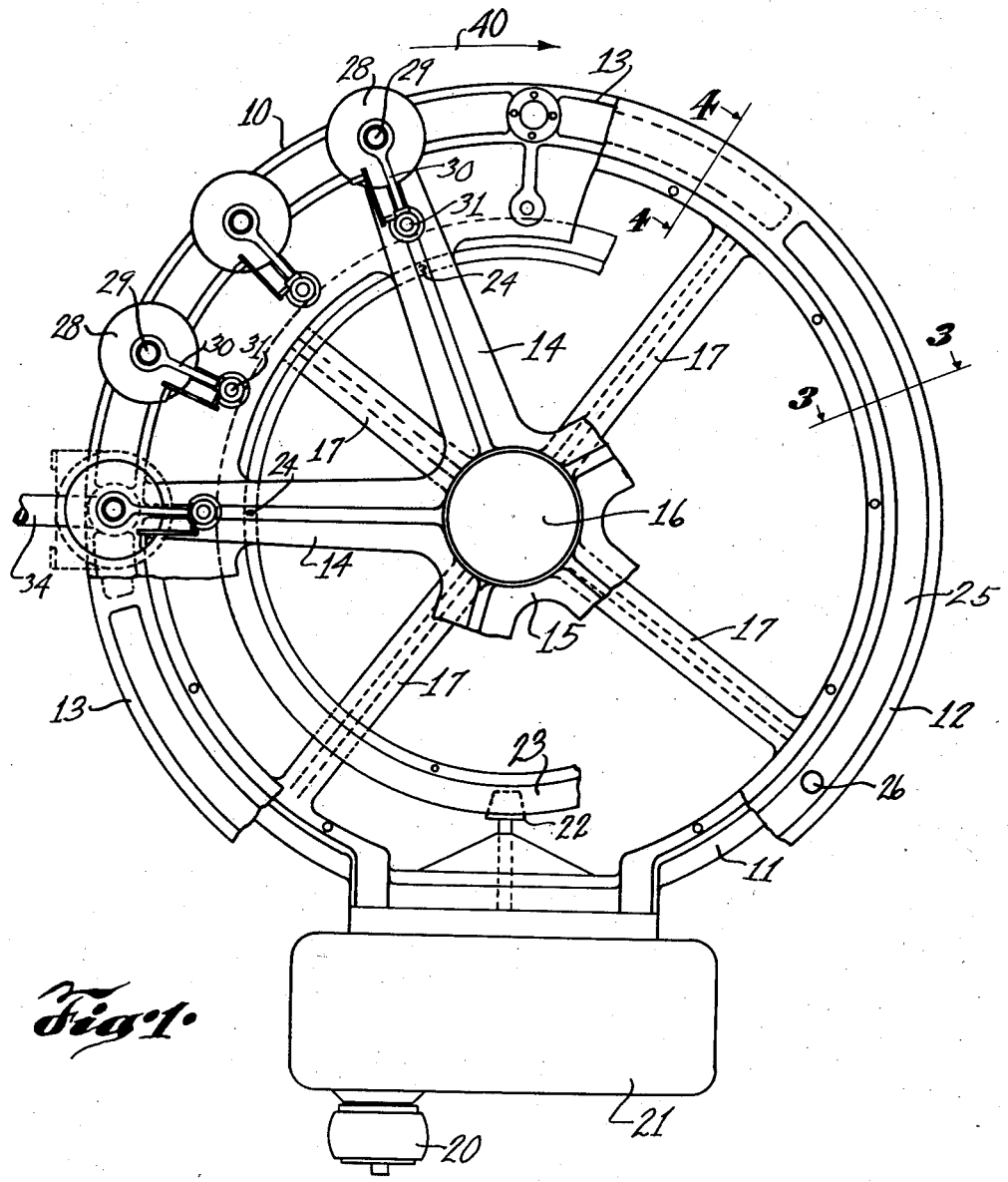

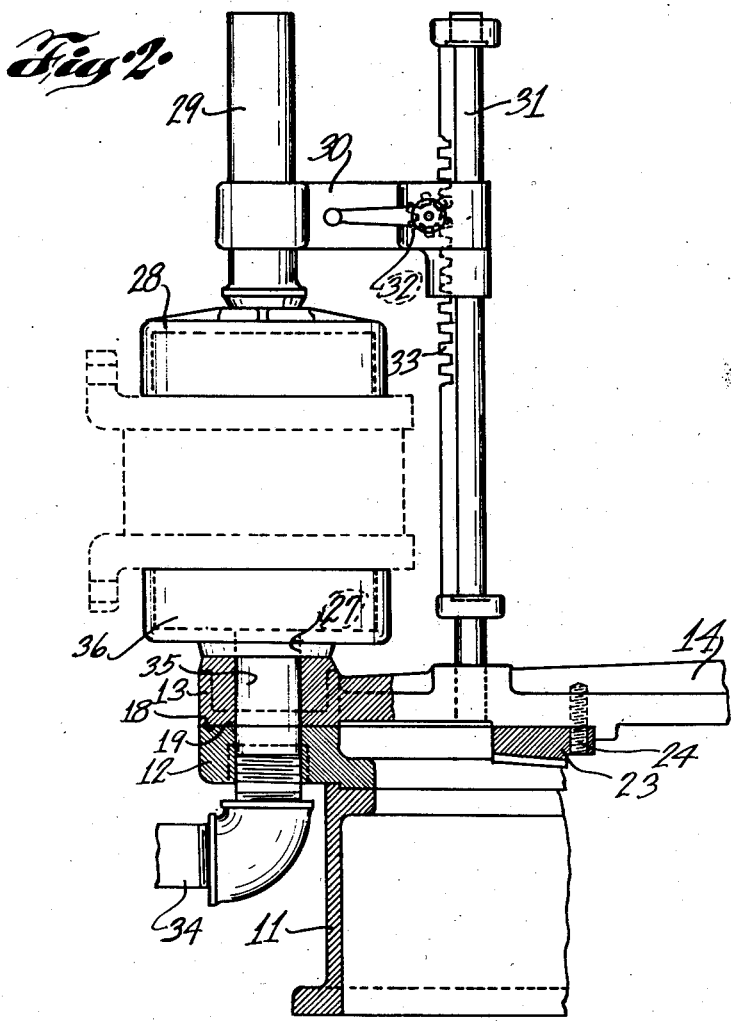
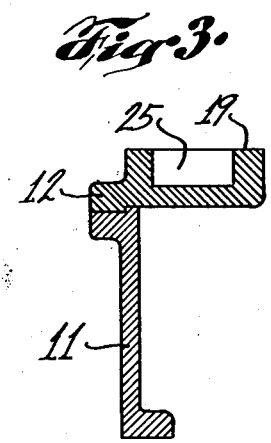
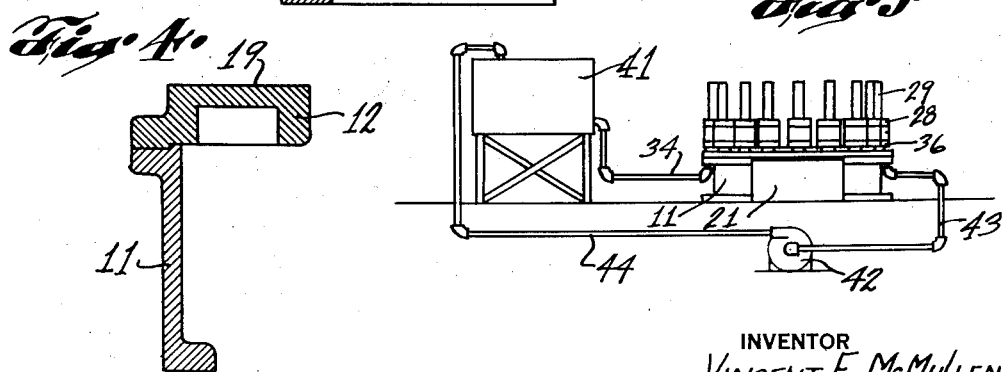

1,991,620

UNITED STATES PATENT OFFICE 1,991,620

VARNISHING MACHINE

Vincent E. McMullen, Beloit, Wis., assignor to Fairbanks, Morse & Co., Chicago, Ill., a corporation of Illinois Application June 23, 1932, Serial No. 618,838

15 Claims. (Cl. 91—46)

This invention relates to improvements in machines for applying surfacing liquids, and more particularly to a machine for use in applying varnish to the stator and stator coils of an electric machine, or the like.

An object of the present invention is attained in an improved machine which is arranged to impregnate the stator coils of an electric machine with a liquid coating, such as a varnish and to coat only the interior portion of the stator frame, the outer portion thereof being left untreated to enable that portion to be painted, it having been found difficult to paint over a surface previously treated with a liquid, such as varnish so that the paint will adhere thereto.

A further object of the present invention is attained in an improved machine of rugged construction, which is composed, substantially, of two major portions, one portion being essentially, a table rotatively disposed on the other portion, and carrying, in spaced relation on its periphery, a plurality of chucks, or holding members, each adapted to retain thereon a stator core frame, and its associated coils, in such position as to be readily internally coated with any desired treating liquid which, by way of providing a present example, may be considered as a winding varnish.

A still further object of the present invention is attained in an improved machine of novel construction, which is arranged to impregnate the stator coils and the inner portion of the stator frame of an electric machine with a winding varnish, or any like varnish well known to the trade, and to drain off any excess varnish as the varnished portions are allowed to dry.

Still another object is attained in an improved machine wherein varnishing liquid is admitted in such quantity as to completely fill the space in and about the stator coil windings and the inner portion of the stator coil frame, the varnish being retained therein under pressure as determined by a provision of the machine enabling a head of the liquid varnish to be maintained. Keeping the varnish fluid in and about the stator core winding and the inner portion of the stator core frame under a certain pressure, the varnishing liquid being maintained therein for a length of time as determined by the movement of the varnishing machine, assures a thorough impregnation of the stator coils and the inner portion of the stator core frame.

Further objects and advantages of the invention will appear from the following description, and from the appended drawings, in which:

Fig. 1 is an elevation of the complete varnish machine, with certain portions of the machine removed to show, more clearly, its construction; Fig. 2 is a fragmentary end elevation of a portion of the machine, a part thereof being in section, showing the method of retaining the stator core assembly of an electric machine, shown in dotted lines, in position to receive the varnish liquid; Fig. 3 is a fragmentary vertical section of a portion of the machine as taken along line 3—3 in Fig. 1; Fig. 4 is a fragmentary vertical section of a portion of the machine as taken along line 4—4 in Fig. 1, and Fig. 5 is a diagrammatic view of the varnishing machine, supply tank, liquid return pump, and pipe connections between each of the devices.

Referring now to the drawings by numerals of reference, 10 indicates, generally, the varnish machine, which is composed of a stationary annular supporting structure 11, a stationary ring member 12 mounted on the supporting structure 11, and a rotatable table structure 13, in sliding engagement with the stationary ring 12. The table member 13 is formed on radial arm members 14, the members joining at their inner ends to form a hub portion 15 which is secured to a central supporting shaft 16. Radial arm members 17, which are preferably formed integrally with the stationary support 11, are provided to form at their juncture, a bearing seat (not shown) for the shaft 16. The lower surface 18 of the table member 13 slidably engages the upper surface 19 of the member 12, the surfaces being machined to form as near a perfect sliding joint as possible, for a purpose presently to appear. The table member 13 is rotated preferably by an electric motor 20, operating, through a reduction gear assembly 21, a pinion 22 engaging a gear ring 23, the gear being disposed on the under side of the member 13, and held to the arm members 14 by suitable bolts 24. The reduction gear assembly 21, operatively interposed between the motor 20 and the pinion 22, is provided to reduce the rotating movement of the ring member 13 to such an extent as to give sufficient time to effectively complete the varnishing and draining process.

A trough or channel 25, disposed centrally of the surface 19 of stationary member 12, extends over substantially the greater portion of the peripheral length of the surface 19, a cross section of the channel being illustrated in Fig. 3. The channel, having an outlet passage 26, is provided for a purpose which will more fully appear hereinafter in a description of the operation of the machine. The remaining peripheral surface of the member 12 presents a flat and unbroken surface to the surface 19 of the member 13, a cross section of that portion of the member 12 being shown in Fig. 4.

Secured in spaced relation on the periphery of the member 13 are a number of chucks 36, each formed to fit the machined circle on the end of the stator frame assembly of an electric machine, such as is shown in dotted lines in Fig. 2, each chuck having a central passage 27 in alignment with a passage 35 extending through the peripheral portion of the member 13, the passage being provided for a purpose presently appearing. A cover member or hood 28, similar in form to the chuck member 36, is provided to engage the upper portion or end of the stator core assembly, shown in dotted lines in Fig. 2, the cover portion having secured thereto a hollow cylinder 29, the cylinder chamber being connected with the cover chamber by an aperture or passage (not shown) therebetween. The hood 28 and the cylinder 29 are preferably held by an arm member 30 disposed in sliding relation on an upright member, or post 31, the arm 30 carrying a manually operated pinion 32 engaging a rack 33 carried by the post 31, for manually adjusting the position of the cover to accommodate stator core assemblies of various length. The cover 28 is maintained in contact with the stator frame by a suitable latch (not shown) on the arm 30, arranged to operate on the rack 33. The post is carried by the table member 13 adjacent the chuck member 36 and inwardly thereof. An inlet pipe for the varnish fluid, indicated as 34, is secured in a peripheral portion of the stationary ring member 12, the inlet passage thereof being in exact alignment with the passage 35 associated with each chuck 36 as the individual chuck is brought to liquid charging position over the stationary inlet passage 34.

Proceeding now with a brief description of the operation of the varnishing machine; a stator core assembly is placed in engagement with the chuck 36, and the cover member 28, with its associated cylinder 29, brought into engagement with the upper end of the stator core by rotating the pinion 32 on its rack 33, the cover and cylinder being held in place by reason of the frictional engagement of the pinion 32 with the rack 33 and a latch member (not shown). The table member 13 may now be rotated by starting its driving motor 20, the direction of rotation being preferably as shown by the arrow 40 in Fig. 1, and as the passage 35 in the member 13 comes into register with the passage in the pipe 34, varnish liquid rises through the stator core assembly and up into the cylinder 29 to a level which corresponds to the level of the liquid varnish in a supply tank such as 41 in Fig. 5, the varnish liquid being kept under such pressure that the liquid will not overflow the top edge of cylinder 29. As the table further rotates, the varnish supply is cut off by reason of the passage 35 passing out of alignment with the passage in the supply pipe 34, the liquid varnish remaining in and about the windings of the stator core frame, to the level in the cylinder 29, for a certain period of time, under pressure as produced by the head of liquid in the cylinder 29, so as to thoroughly impregnate the winding and the inner portion of the stator core assembly. When the chuck 36 moves over the channel 25 in the stationary ring member 12, the trapped varnish is allowed to run out into the channel through the passage 35, and is carried away, through the drain passage 26, to a suitable storage tank, from which it may be returned by a suitable pump to the supply tank connected with pipe 34, or, as shown in Fig. 5, the liquid draining off may be carried directly to a pump 42 by a pipe 43, and thence returned to the tank 41 through pipe 44. As the channel 25 covers a considerable portion of the peripheral length of the member 12, and as the table member 13 carrying the stator core moves very slowly, ample time is provided so that the stator core assembly may fully drain. It will be noted that, by reason of the exact engagement of the planar surfaces 18 and 19 of the members 12 and 13, respectively, leakage of the liquid varnish at this juncture is entirely eliminated. By the provision of a plurality of chucks 36, as described hereinbefore, a number of stator core assemblies may be treated with varnish in succession, as the machine slowly rotates.

In the operation of the machine, the coated stator frames and coils are removed from the chucks as they approach the charging passage 34, preferably at a convenient point in their travel between the reduction gear assembly 21 and the charging passage 34. As each coated frame is removed from its holding chuck, an uncoated stator frame is immediately placed thereon, thus providing a continuous operation of the coating machine.

It will be observed that the machine, in its present form, is particularly adapted to internal treating of an electric machine stator frame, or any other device or machine which contains a hollow interior portion which it is desired to treat with a liquid coating, such as a varnish or liquid insulating material. To further extend the use of the machine, the chuck, as described herein, may be removed, and an adjustable holding device, capable of accommodating a variety of forms and shapes of devices to be treated, substituted in its place. A like change in the hood 28 would be necessary to enable it to coact properly with the adjustable holding device in accommodating devices of variant form and size.

It will be noted that the present description covers only a single embodiment of this invention, and that substantial changes and modifications may be made without departing from the full intended scope of the invention, as set out in the appended claims.

I claim:

1. In a device for internally coating hollow articles having an opening therethrough, a pair of liquid-receiving, clamping members, means for applying said clamping members endwise to the article to be coated, spaced points for the application and removal of liquid to and from said members and article and means for moving same between said points.

2. In a device for the application of a coating material to the interior of a hollow element, spaced holders for an element to be coated, constituting receivers for the coating material and serving as closures to confine the material to the interior of the element, means for supplying and draining the coating material to and from said holders and element, at spaced locations, a closed track connecting said supply and drain means, and means for moving the element and holders along said track.

3. Apparatus for applying a liquid coating material to the frame of an electric machine, including a pair of variably spaced liquid containing elements constructed to receive therebetween a frame to be coated, and located so as to be brought into fluid communication through the frame, a track for said elements and article, means for movement thereof along said track, means for delivering the liquid to said elements and article at one location along said track, and means for draining the liquid from said elements and article at a location along said track, spaced from said delivery location.

4. In a varnishing machine for motor frames, a stationary member, a member rotatably disposed on said stationary member, varnish receiving elements, forming caps for the ends of a frame to be varnished, and carried by the rotatable member, said stationary member having a planar portion including a varnish supply port, extending over a section of its periphery, said port being in communication with said caps and a varnish drainage channel extending over another portion of its periphery, spaced from the planar portion.

5. In a machine for applying a liquid coating to the stator frame and windings of an electric machine, a stationary member, a rotating member disposed on said stationary member, paired frame-holding elements disposed in adjustably spaced relation, and carried on the periphery of the rotating member, said holding elements adapted grippingly to engage, and close the opposite ends of the stator core frame, means for operating said rotating member and means for actuating said holding elements to bring them into holding and sealing relation to the frame.

6. In a machine for applying a liquid coating to the stator core frame and windings of an electric machine, a stationary member, a rotating member slidably disposed on said stationary member, holding means on said rotating member adapted to engage and seal the ends the stator core frame, in gripping relation therewith, and means for supplying the varnish liquid under pressure, to the space within the stator core frame, and about the stator windings.

7. In a machine for applying a liquid coating to the stator core frame and windings of an electric machine, a stationary member, a rotating member, paired, hollow stator core frame holders carried on said rotating member, means for supplying a coating liquid under pressure to the space within the stator core frame and holders and about the stator windings, when the holders are in a predetermined position with respect to the stationary member.

8. In a liquid coating machine for electric motor frames, a supporting frame, a circular track on said frame, a circular member adapted to travel on said track, a liquid charging passage through a portion of said track, a device on said circular member including spaced closures for holding and sealing the frame to be coated, and a passage through a portion of said member extending through the spaced closures and frame under treatment, said passage having an inlet positioned to register with the charging passage, at a predetermined position in the path of travel of said circular member.

9. In a device for applying a liquid coating to an interior portion of the frame of an electric machine, a circular track, a member adapted to travel on said track, spaced, adjustably related holding elements on said member for grippingly engaging therebetween, the machine frame to be treated, a passage extending through said member and into the holding elements, and a charging passage through said circular track positioned to register with the passage in the member and holding elements at a predetermined stage in the path of travel of said member and holding elements.

10. In a machine for liquid-treating an interior portion of a device, such as the stator frame and coils of an electric machine, a circular guide member, a rotating member slidably engaging said guide member, a support on said rotating member adapted to be engaged by one end of said stator frame, a hood engaging the other end of said frame, a hollow member associated with said hood, and an adjustable holder for said hood and hollow member, disposed on said rotating member in adjacence to said support.

11. In a machine for applying a liquid coating to the stator core frame and windings of an electric machine, a stationary member, a rotating member on said stationary member, hollow frame-holding elements arranged in opposed spaced relation on said rotating member, for closing, and grippingly engaging the stator core frame, a liquid inlet passage extending through said holding elements and said rotating member, and an inlet passage, disposed in said stationary member, adapted and positioned to align with the passage extending through the said holding elements and rotating member, at a predetermined position in the path of movement of the rotating member.

12. In a machine for applying a liquid coating to the stator frame and windings of an electric machine, a stationary member, a member rotatable thereon, holding means adapted to retain the stator core frame on said rotating member, said means including a cup-shaped member engaging the stator frame, a hollow cylinder associated with said cup-shaped member, an arm adjustably secured to said rotating member, said arm being adapted to support said cylinder and cup-shaped member, and means for supplying and draining a coating liquid to and from said cup member, cylinder and frame, at spaced locations along the stationary member.

13. In a machine for applyng a liquid to the interior of an open-end structure, a hollow rest for the structure to be treated, a hollow cover therefor, means for adjusting the spacing of the rest and cover, the means adapted to clamp therebetween the structure to be treated, means for supplying the treating liquid to the interior of the rest and cover and to the interior of the treated structure, and a liquid reservoir carried by the cover above the treated structure, and adapted to impress an appreciable pressure upon the liquid in said structure.

14. Apparatus for applying varnish to the interior of the frame of an electric machine and the stator windings thereof, the apparatus including a receptacle having an upwardly presented opening and constituting a rest for the frame to be treated, a cover for the frame having a downwardly presented opening, the said openings being of a form to engage the opposite ends of the frame and grippingly to position the frame between the receptacle and cover, means for vertically adjusting the cover, a varnish supply pipe connected with the supporting receptacle, and means connected with the cover adapted to impress an appreciable pressure upon the varnish in the cover, receptacle and frame under treatment.

15. In a device for the varnish-impregnation of a motor frame and stator windings, a pair of bell elements, means for supporting said elements in spaced relation and in gripping engagement with a motor frame therebetween, a varnish supply pipe leading to one of the bell elements for substantially filling both elements and the frame, and a standpipe structure carried by the other element and adapted to impress an appreciable pressure upon the varnish in the bell elements and frame.

VINCENT E. McMULLEN.